(12) United States Patent
Snook

(10) Patent No.: US 6,400,378 B1
(45) Date of Patent: *Jun. 4, 2002

(54) HOME MOVIE MAKER

(75) Inventor: Stephen Tupper Snook, Los Gatos, CA (US)

(73) Assignees: Sony Corporation, Tokyo (JP); Sony Electronics, Inc., Park Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/938,284

(22) Filed: Sep. 26, 1997

(51) Int. Cl.$^7$ .............................................. G06F 17/00
(52) U.S. Cl. ..................... 345/716; 707/500.1; 707/102; 707/104
(58) Field of Search .................... 707/1–206, 501–540, 707/500.1; 345/302–349, 433, 145, 434–435, 716–726

(56) References Cited

U.S. PATENT DOCUMENTS

| | | | | |
|---|---|---|---|---|
| 5,237,648 A | * | 8/1993 | Mills et al. ................. | 345/433 |
| 5,404,316 A | * | 4/1995 | Klingler et al. ............. | 707/530 |
| 5,467,288 A | * | 11/1995 | Fasciano et al. ............ | 707/512 |
| 5,513,306 A | * | 4/1996 | Mills et al. ................. | 707/530 |
| 5,574,934 A | * | 11/1996 | Mirashrafi et al. .......... | 707/526 |
| 5,675,752 A | * | 10/1997 | Scott et al. ................. | 345/333 |
| 5,682,326 A | * | 10/1997 | Klingler et al. ............. | 345/302 |
| 5,758,093 A | * | 5/1998 | Boezeman et al. ......... | 345/333 |
| 5,790,114 A | * | 8/1998 | Geaghan et al. ............ | 345/326 |
| 5,801,685 A | * | 9/1998 | Miller et al. ................ | 345/302 |
| 5,850,629 A | * | 12/1998 | Holm et al. ................ | 704/260 |
| 5,889,514 A | * | 3/1999 | Boezeman et al. ......... | 345/302 |
| 5,950,001 A | * | 9/1999 | Hamilton et al. ........... | 707/102 |
| 5,960,442 A | * | 9/1999 | Pickering ................... | 707/200 |
| 5,982,365 A | * | 11/1999 | Garcia et al. ............... | 707/102 |

OTHER PUBLICATIONS

Gatica–Perez et al., "Multiview extensive partition operators for semantic video object extraction" Circuits and Systems for Video Technology, IEEE Transactions on, vol. 11, Issue 7, Jul. 2001, pp. 788–801.*

Gatica Perez et al., "Generating video objects by multiple–view extensive partition lattice operators", Image Processing, 2000 Proceedings, 2000 International Conference on, 2000 vol. 3, pp. 508–511.*

Chan et al., "VideoMAP* :a Web–based architecture for a spatio–temporal video database management system", Web Information Systems Engineering, 2000, Proceedings of the First International Conference on, vol. 1, 2000, pp. 393–400.*

* cited by examiner

Primary Examiner—Thomas Black
Assistant Examiner—David Jung
(74) Attorney, Agent, or Firm—Blakely, Sokoloff, Taylor & Zafman LLP

(57) ABSTRACT

The home movie editor of the present invention provides a simple but effective user interface and control mechanism which enables the user to edit video. The editor is preferably operable on a personal computer found in many homes today. The home movie editor consists of the graphical user interface and device control modules which interface via a bus to the video playback and recording hardware. The editor scans in video clips as thumbnails and displays the thumbnails in the clip window of the display. Using a cursor and cursor control device, the user can drag and drop clips into the edit window which visually depicts a sequence of edited clips showing the sequence of thumbnails. The clip insertion function is simplified by the insertion pointer that points to the clip boundary closest to the location of the cursor.

19 Claims, 13 Drawing Sheets

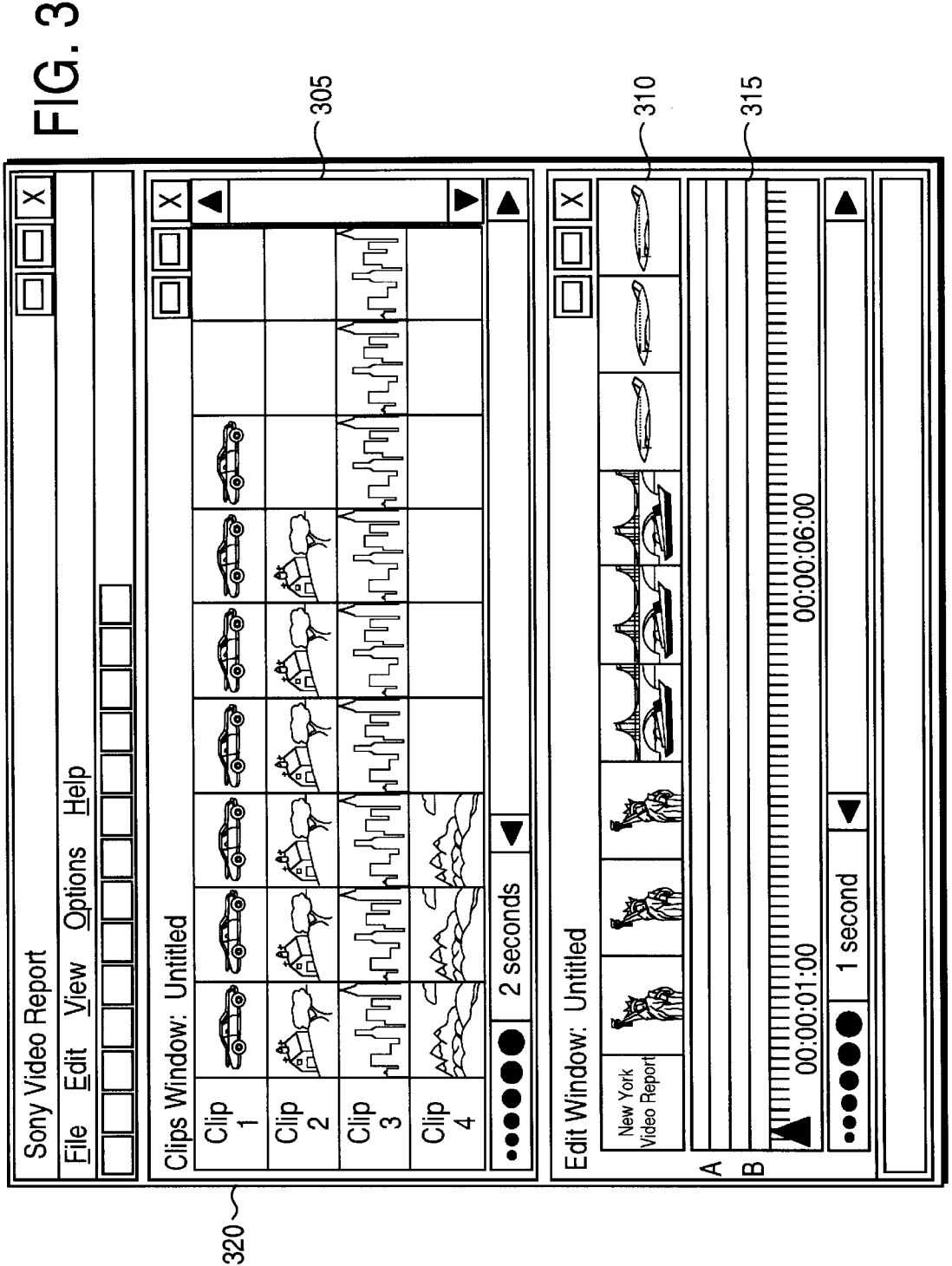

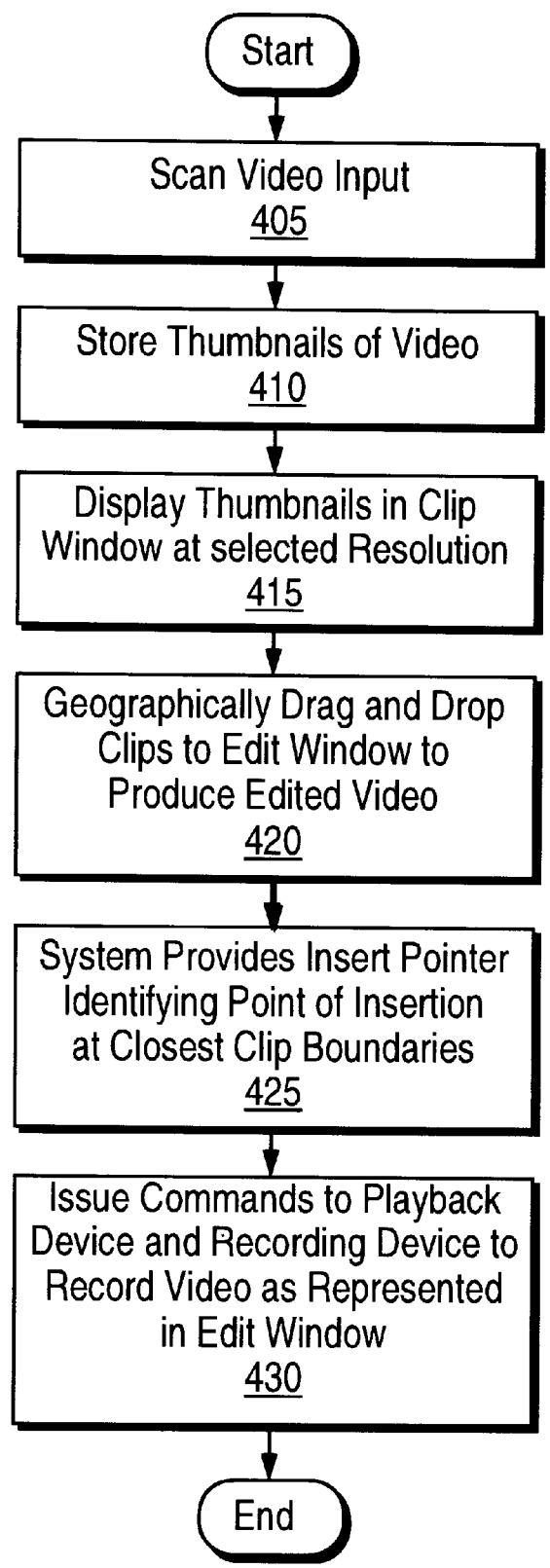

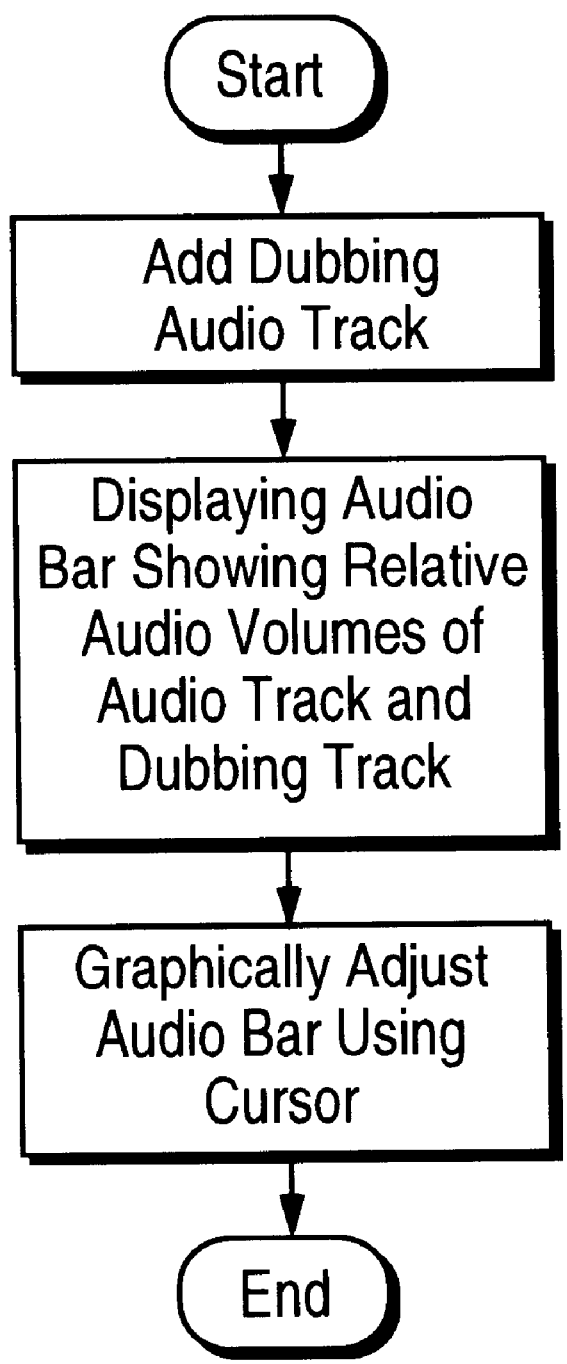

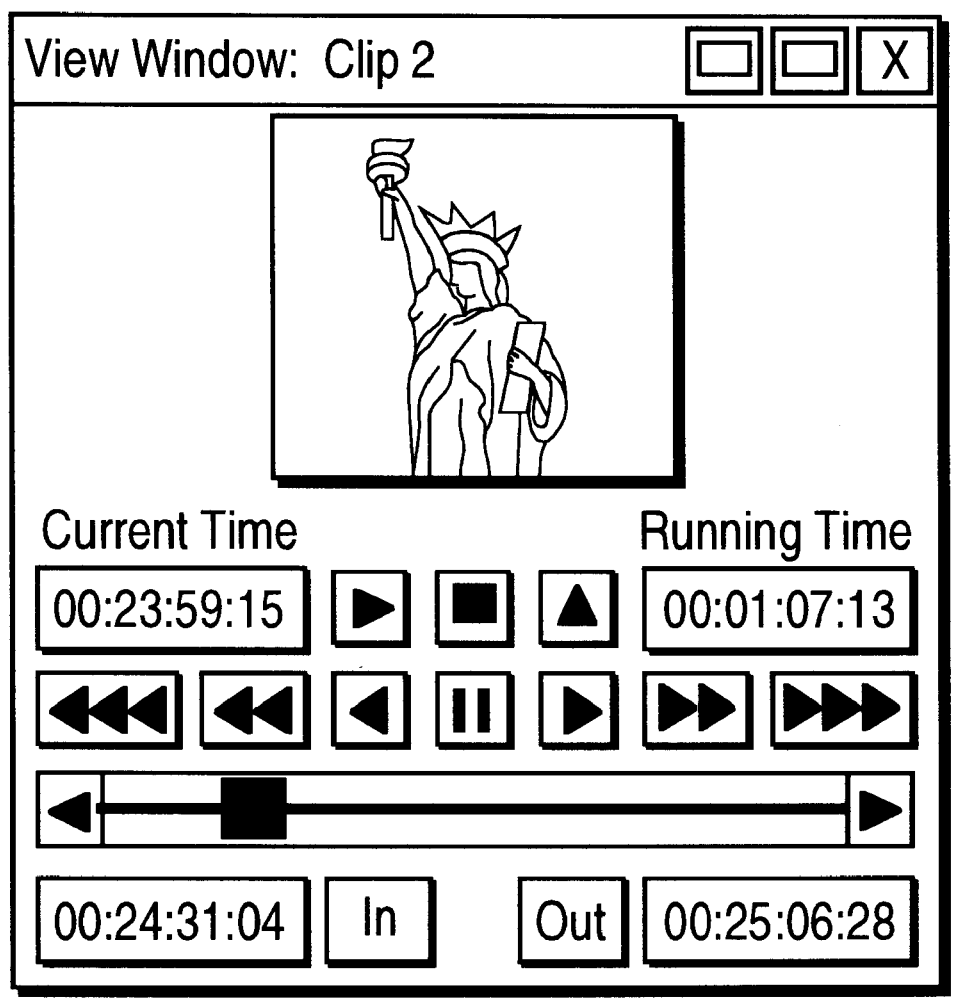

HOME MOVIE MAKER

BACKGROUND OF THE INVENTION

1. Field of the Invention

The present invention is directed to editing systems and video images. More particularly the present invention is directed to a home movie editor.

2. Art Background

Home computers have become powerful enough to execute multimedia applications that enable a user to view and manipulate different types of media, including video. In response to interest in computer manipulated video, several companies have introduced home movie editors. However, the editors are either complex and feature packed for hobbyists, or so simple the editor does not perform those tasks a typical home user making family videos requires.

SUMMARY OF THE INVENTION

The home movie maker of the present invention provides a simple but effective user interface and control mechanism which enables the user to create home movies. The editor is preferably operable on a personal computer found in many homes today. The home movie editor consists of the graphical user interface and device control modules which interface via a bus to the video playback and recording hardware. The editor scans in video clips as thumbnails and displays the thumbnails in the clip window of the display. Using a cursor and cursor control device, the user can drag and drop clips into the edit window which visually depicts a sequence of edited clips showing the sequence of thumbnails. The clip insertion function is simplified by the insertion pointer that points to the clip boundary closest to the location of the cursor.

In one embodiment, the editor includes the capability to trim clips. Also, a view window is preferably included. The view window enables a user to view clips that are playing back a corresponding portion of the video represented by a selected clip.

In another embodiment, the home movie editor includes a display of audio tracks. For example, an audio track taken with the video and a dubbing track are displayed. Between the tracks, a graphical representation of the relative loudness of the tracks is depicted. Using the cursor, the user can easily control the relative loudness to the desired levels. Once the editing process is completed, the editor issues the necessary commands to transfer video in the edited sequences from the playback apparatus to the recording apparatus.

BRIEF DESCRIPTION OF THE DRAWINGS

The objects, features and advantages of the present invention will be apparent to one skilled in the art from the following detailed description in which:

FIG. 3 illustrates one embodiment of the graphical user interface that enables a user to easily make video clips in accordance with the teachings of the present invention.

FIG. 4 is a flow chart illustrating one embodiment of the process for editing videos in accordance with the teachings of the present invention.

FIG. 8b illustrates the process for changing the relative loudness of audio tracks in accordance with the teachings of the present invention.

FIG. 9 illustrates a view window.

DETAILED DESCRIPTION

In the following description, for purposes of explanation, numerous details are set forth in order to provide a thorough understanding of the present invention. However, it will be apparent to one skilled in the art that theses specific details are not required in order to practice the present invention. In other instances, well known electrical structures and circuits are shown in block diagram form in order not to obscure the present invention unnecessarily.

Figure 1:
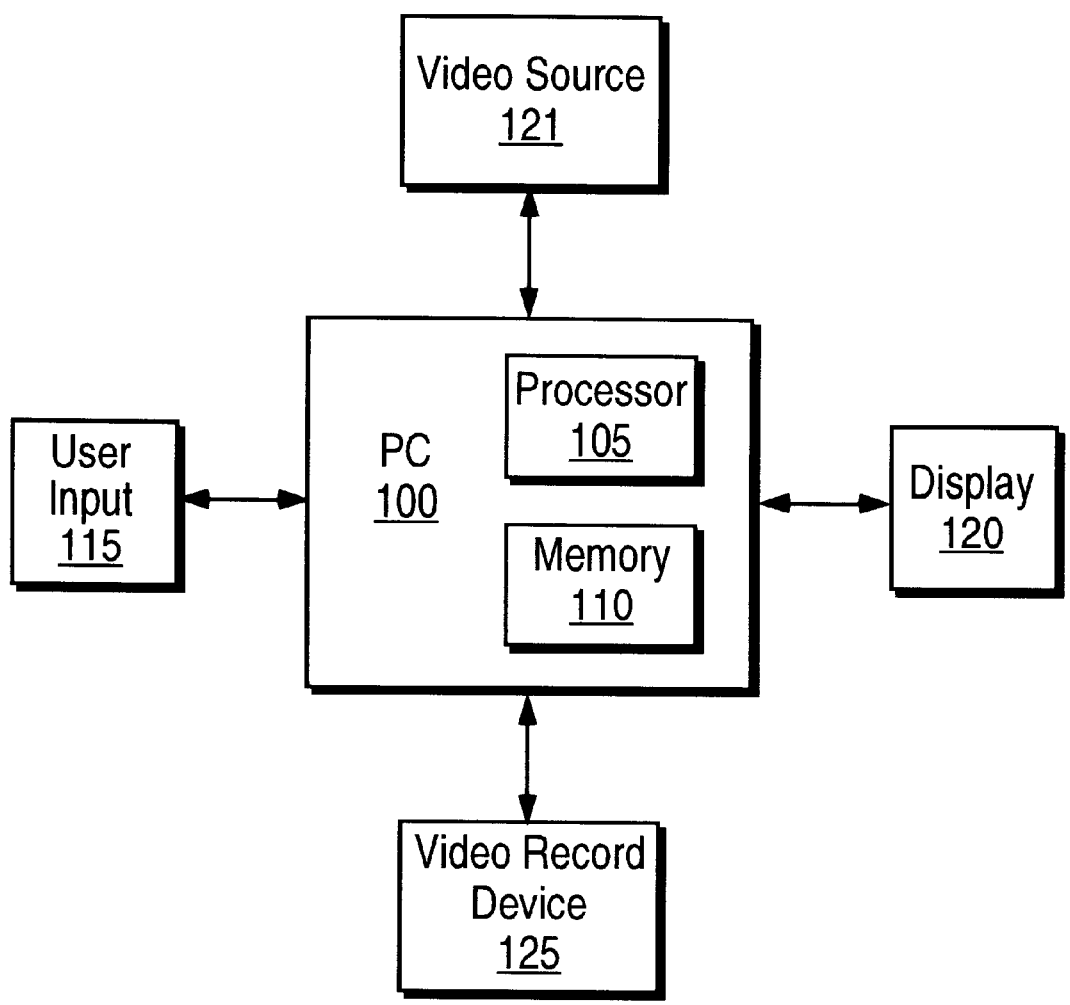
FIG. 1 is a simplified block diagram illustrating one embodiment of the system of the present invention.

The system of the present invention provides a simple but effective graphical user interface and control mechanism to enable a home user to easily edit video. A simplified block diagram of the system is illustrated in FIG. 1. Referring to FIG. 1, the system is preferably embodied on a personal computer 100, which includes a processor 105 and memory 110. In addition to other elements typically found in a personal computer system, the user can input information via the user input device 115, which may be a keyboard, a mouse or the like. Preferably, the user utilizes a cursor control device, such as a mouse or a track ball, to manipulate a cursor or pointer on the display 120. The display will display the user interface and the thumbnail representation of the clips as described in the following text.

In addition, the system 100 is coupled to the video source device that plays back video 120, and a video record device 125. The system issues commands to the source 120 to play back video, and the record device 125 to record video in the sequence dictated by the editing the user performed on the system 100.

Figure 2:
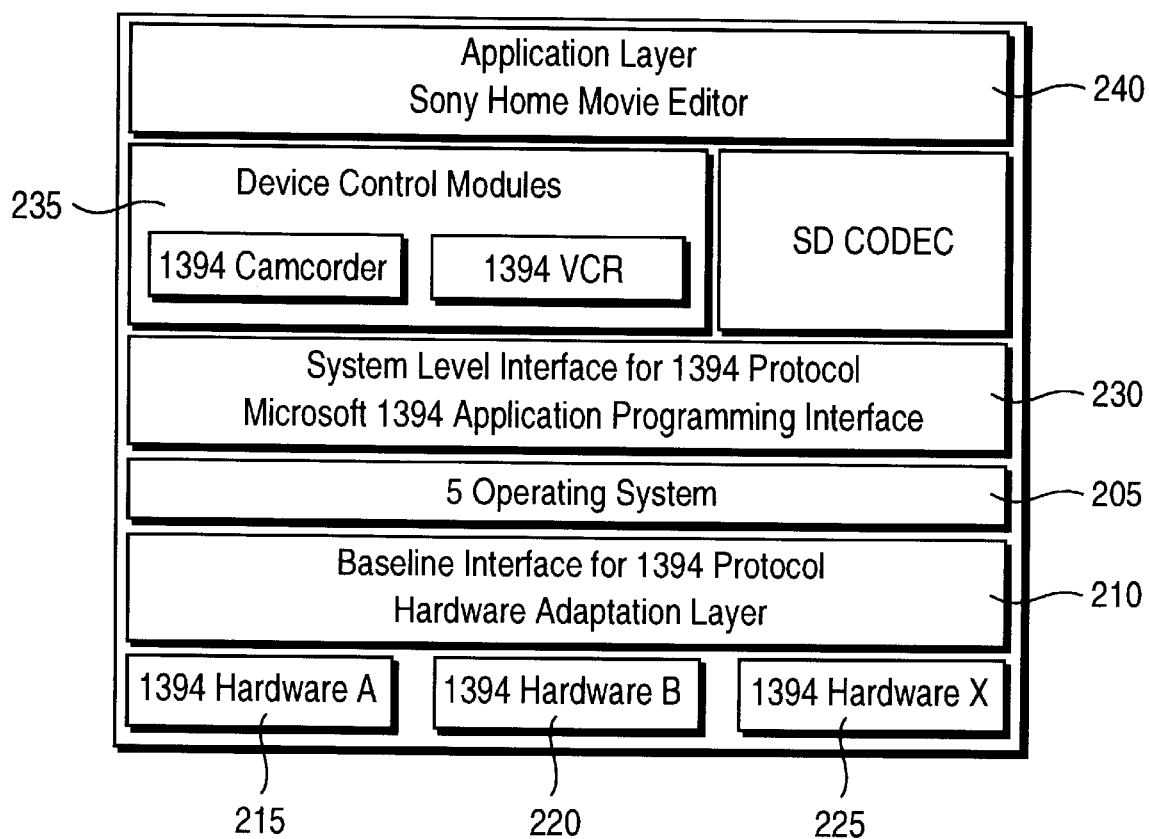
FIG. 2 illustrates the one embodiment of the system architecture employed in the system of the present invention.

FIG. 2 illustrates exemplary system architecture. In this system, the operating system 205 is layered on top of the bus interface 210, which interfaces to a hardware device control bus that enables the operating system 205 to control certain coupled hardware 215, 220, 225. Preferably, the bus follows the IEEE 1394 standard (the standard is available from the Institute of Electrical and Electronic Engineers). The hardware devices 215, 220, 225 typically will be video playback and recording devices. The architecture includes an application programming interface (API) 230 that assists in programming control of the hardware devices 215, 220, 225.

In the present embodiment, preferably included are device control modules configured to controls standard devices, such as a camcorder and VCR. At the very top layer is the application layer 240 which includes the code executed to provide the graphical user interface (GUI) and the functionality described herein.

FIG. 3 is a representation of one embodiment of the GUI of the present invention. Using this GUI, the user is able to manipulate clips to produce and edit video output. The GUI includes a clip window 305, in which thumbnails of clips scanned into the system are visually depicted, an edit window 310, in which the user drags and drops clips and orders clips in a certain sequence that is desired as output, and an audio window 315, which provides a graphical depiction of audio tracks, such as a track recorded with the video, and a dubbing track, and further provides, as will be described below, a graphical representation of the relative loudness between tracks, which is adjustable by the user. Also included is the tool bar 320, which provides a variety of functions described herein.

A simplified flowchart illustrating an exemplary process for editing video is shown in FIG. 4. At step 405, the video input is scanned. At step 410 a thumbnail of each frame of video is stored, and at step 415, the thumbnails are displayed in the clip window. Every thumbnail in the present embodiment is a 90 by 60 pixel image. The image represents a particular frame in the tape. A thumbnail has an associated absolute track number (ATN). The absolute track number is a unique number that represents a particular location on the tape. No two frames on a tape have the same ATN number. The thumbnail also includes audio data that is a representation of the audio that has been recorded in a particular frame.

The clip window therefore contains thumbnail representation of frames of the source tape. Thumbnails can be displayed in the clip window in different views. The default is that the clips in the clip window will be displayed in the sequence found on the source tape. Depending upon the resolution or zoom of the display of the clip window, all or some of the thumbnails derived from the source tape are displayed in the clip window. Preferably, the thumbnails are stored in a database in memory and accessed as needed to provide the visual representations in the clip window.

Figure 5A:
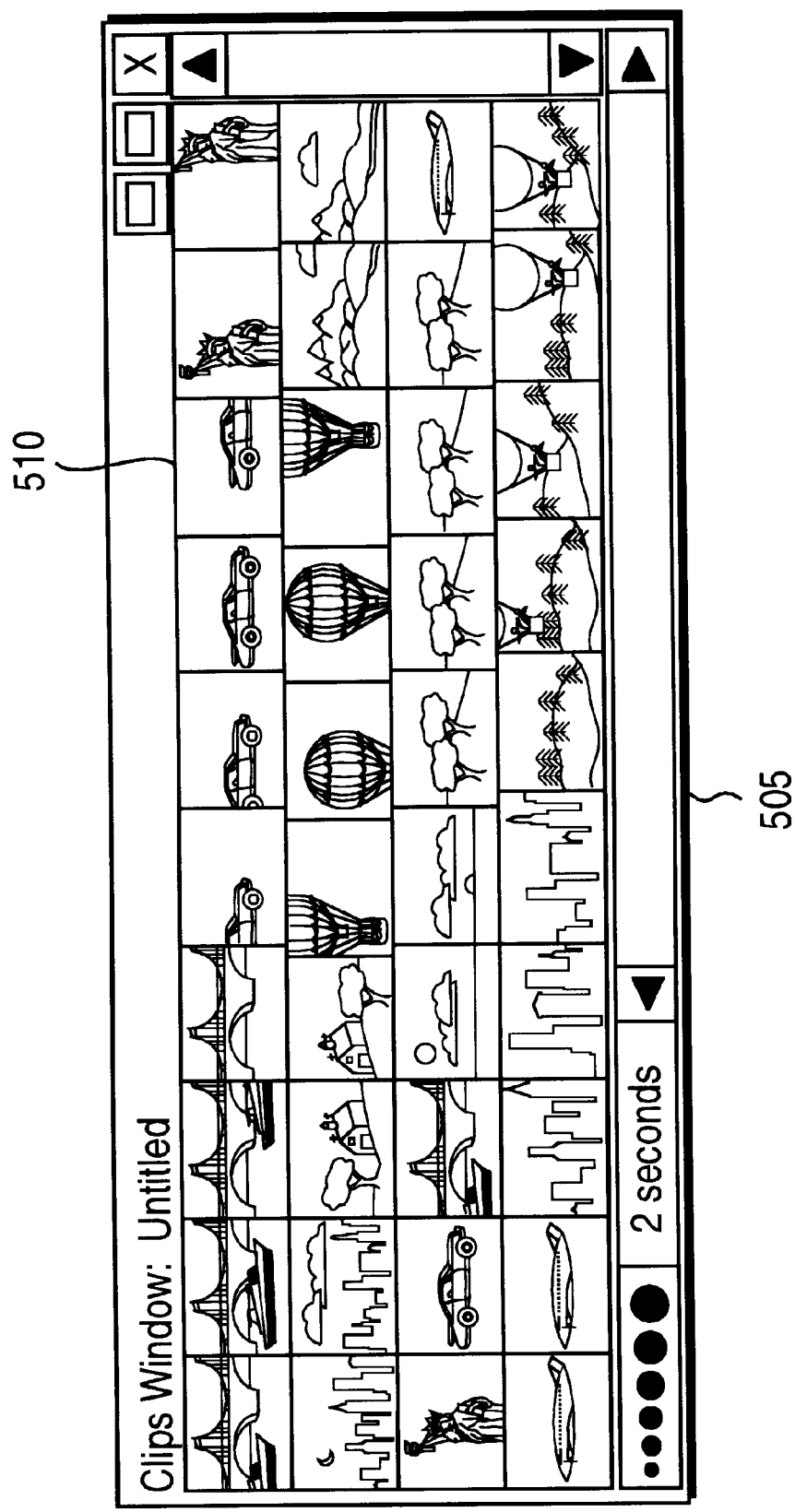
FIGS. 5a, 5b and 5c illustrate different embodiments of the clip window in accordance with the teachings of the present invention.

FIG. 5a illustrates a clip window with a number of clips scanned in from a tape and displayed at a resolution of one thumbnail for every two seconds of tape. In one embodiment, the clip window displays one tape at a time. However, it is contemplated that the clip window would have representative clips from a variety of tape sources. In addition, the present embodiment of the graphical user interface includes one clip window. It is further contemplated that multiple clip windows are provided on a display.

As shown in FIG. 5a, thumbnails are organized by clips recorded sequentially on the tape. When displaying a clip, the thumbnail representation of the first frame in that clip will be the first one to be displayed inside the clip window. If the length of that clip is actually shorter than the zoom value, then only a partial thumbnail is shown at the end of that clip. However, if the length of the clip is longer than the zoom value, a full sized thumbnail of the first frame is shown and a subsequent number of thumbnails, their representation and number depending upon the zoom value and the remaining length of the clip. The zoom value is adjustable by the window feature 505.

As discussed above, a thumbnail is a lower resolution snapshot of a frame of the video. Thumbnails may be brought into the clip window three different ways. In one embodiment, an auto scan function is chosen. This function enables the entire tape source to be automatically scanned. Thumbnail representations of every single frame containing data are loaded into a database in the system for access for generation of the GUI. Preferably, the thumbnails are displayed in the clip window and then accessed from the database. The manual scan function may also be used. Using the manual scan function, the user can specify particular frames or a set of frames to be edited to the clip window. This can be done by using the clip viewer (see FIG. 9). Only those frames of the tape selected via the viewer will have thumbnails generated and stored in the database. For example, a clip viewer identifies an in and out ATN number for clips. For in and out ATN numbers identified, the clip window searches for those frames in the tape, generates thumbnails and loads them into the database. In the present embodiment, the database stores information that is in the clipboard window, edit window, the clip viewer, and the clipboard. For example, the database permits the simple storage and retrieval of the fix number of clips to allow the other parts of the application, e. g. clip window, edit window, to operate.

Figure 10:
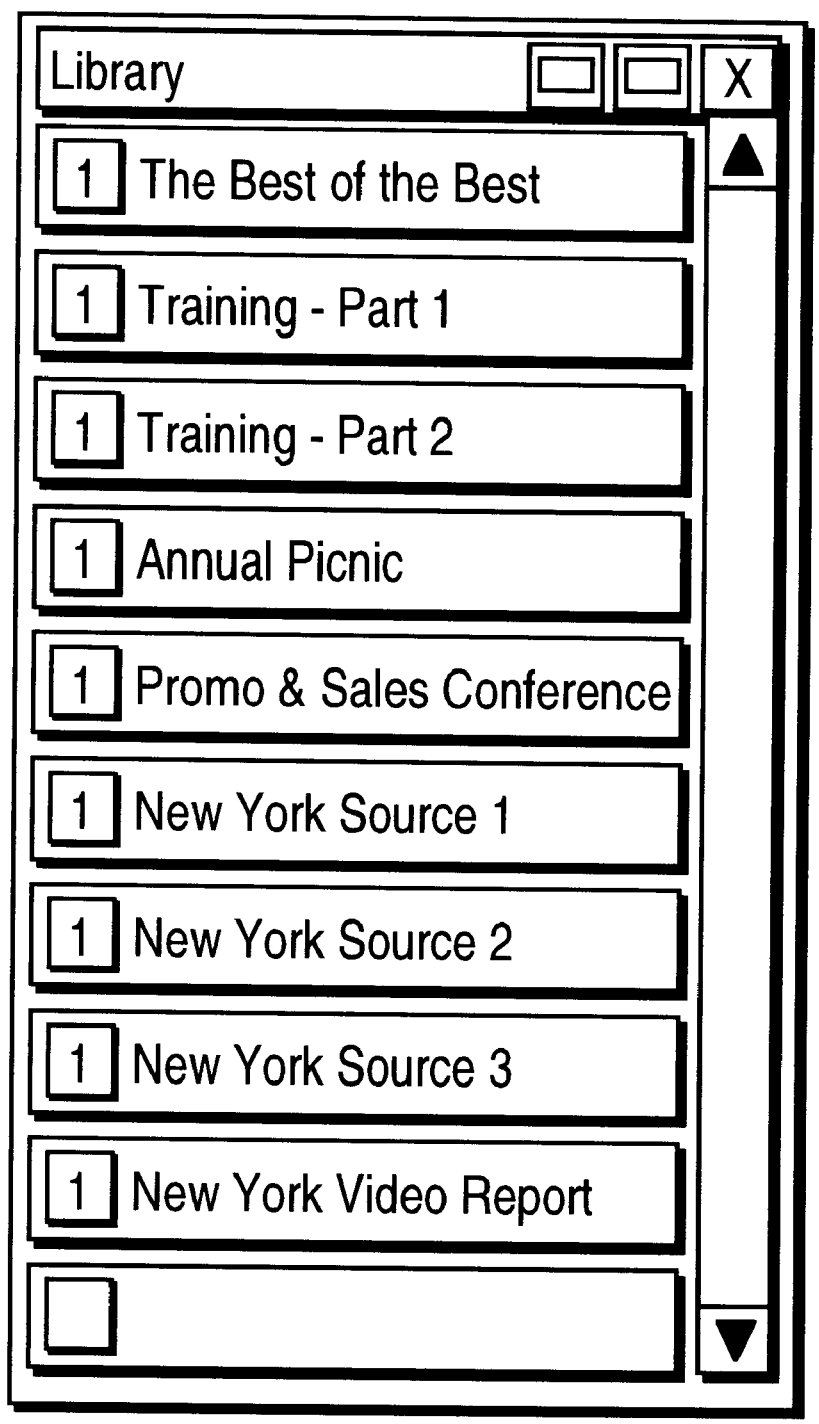
FIG. 10 illustrates a tape library window.

A library may also be collected and a tape may be selected from the library (see FIG. 10). In this function, all the thumbnails from the tape and from the library will be stored in the clip window.

Referring back to FIG. 4, once the thumbnails are loaded into the database, all or some of the thumbnails are displayed in the clip window, step 415. This is dependent upon the zoom values set. Preferably a dialogue box appears during the scanning process indicating the status. For example, while doing an auto scan the status window inside the dialog box represents the whole tape length and indicates what percentage of the tape already has been captured at that particular time. While doing manual scans, the status bar indicates what percentage of the requested frames from the tape have already been captured. The dialog box has a function pause, resume and stop. When the pause button is selected, the scanning process is paused temporarily. The user needs to press the resume button to continue the scanning process. When the stop button is pressed, the scanning process comes to a halt and everything scanned up to that point remains in the clip window. Therefore, if the user wants to scan only part of the tape, the user can stop the scanning process once the desired clips from the tape have been displayed in the clip window.

Preferably, the user has options in how the clips are viewed. For example, the user can view clips by tape, clips by index and clips by duration. Preferably, by default, the clips are viewed by tape. Once in the clip window the zoom value can be changed by selecting on of the dots (see window 505, FIG. 5) inside the zoom control 505 (FIG. 5). The left-most dot which is the smallest dot, represents the first zoom (e.g., 30 frames per second). Selection of the left-most dot will cause a thumbnail of every single frame on the tape to be loaded on the clip window. This zoom typically is used if it is desirable to see a detailed picture of the tape. However, it is quite probable that in this zoom, not all the thumbnails can be seen at once by the clip window. The clip window may have to be scrolled quite a few times before all the thumbnails can be viewed. The rightmost zoom which is represented by the biggest dot shows the largest zoom. In this zoom, for every minute in the tape, only one thumbnail is shown in the clip window. This zoom can be used to see an overview of the tape. In the present embodiment, there are four zooms in-between the first zoom and the last zoom which can be used.

Once a zoom is selected, the control display displays the zoom value associated with the selection. The grids inside the clip window 510 (FIG. 5a) correspond to the zoom. For example, in a one second zoom, only the first thumbnail from that one second in the tape is shown, each thumbnail inside the grid actually represents one second worth of frame in the tape. That is, the 90 pixel length of the thumbnail actually corresponds to thirty frames in the tape. Similarly, if the zoom is two seconds, the 90 pixel length of the thumbnail represents sixty frames in the tape. Therefore, when representing a clip inside the clip window, depending upon how long the clip is, a fractional thumbnail may need to be used at the end to accurately represent that clip. The length of the fraction is calculated based upon the zoom set at that time and how long a time the particular thumbnail needs to represent. For example, if the zoom is set to one minute, the 90 pixels of the thumbnail represent 1800 frames in the tape. If the clip in the tape is 4 minutes and 22 seconds long, to represent the clip in the clip window, four full-sized thumbnails are shown for the first four full minutes of the clip. The last 20 seconds of the clip will be represented by a thumbnail which is actually 30 pixels long (since 20 seconds is ⅓ of a minute, we need one third of the original thumbnail size is required). Thus, the particular clip inside the clip window is represented by 4⅓ thumbnails.

The clips viewed can also be trimmed in the clip window. This enables a user who may only want to use part of a clip instead of an entire clip to trim the clips by entering the trimming mode. This is preferably a menu item or an item on the tool bar (e.g., scissors tool). In the present embodiment, while in the trimming mode, the shape of the cursor changes to scissors. Once out of the mode, the cursor changes back to an arrow. When in the trimming mode, the user can click using the scissors cursor (by depression of the appropriate key or button on the cursor control device) between any two thumbnails in the clip window to create a trim point. Preferably, if there already is a trim point between the thumbnails, the user clips the trim point to untrim the clip. Preferably, the frames trimmed by the trim operation are marked in some manner but not deleted from the database; this enables the user to "untrim" the clips.

Thumbnails inside the clip window can be reviewed by using the clip viewer (FIG. 9) which is invoked by selecting (e.g., double clicking) on any clip or sub-clip inside the clip window. The clip viewer plays every single thumbnail in the clip in the order of appearance on the clip. After playing the clip, the clip viewer continues playing each subsequent clip in the clip window until the user presses the stop button within the clip viewer or closes the clip viewer. However, if the user selects another clip or sub-clip while the clip viewer is playing, the clip viewer stops playing whatever it was playing before and starts playing the new clip.

The zoom controls how many frames per second are shown in a display. The user is permitted to change the number of frames per second that are displayed in the clip window. The level of detail viewed is changed by changing the zoom. In the present embodiment, six different zooms are supported. The zooms are 30 frames per second which actually shows every single frame on the tape, 10 frames per second which shows only every third frame on the tape, one frame per second which shows every thirtieth frame on the tape, one frame ever two seconds which shows every sixtieth frame on the tape, one frame every ten seconds which shows every three hundredth frame on the tape, and one frame ever minute which shows every 1800th frame on the tape.

The present embodiment also provides for indexing. Each time a user presses the record button on a tape recording device, it is preferred that an index is created at that point. Alternately, indices can be identified by using the receiver to designate start and end points of clips received into the system. The index in the clip window is represented by a solid red line. A set of thumbnails separated by indices are called clips. As a clip is defined by a red line in the present embodiment, a trim, described above, is represented by a green line. By placing a trim within a clip, the user creates a sub-clip. A sub-clip is the part of a clip marked by a solid green line. The user can further place trims within subclips to create more subclips. Thus, subclips are defined by the user.

Figure 5B:
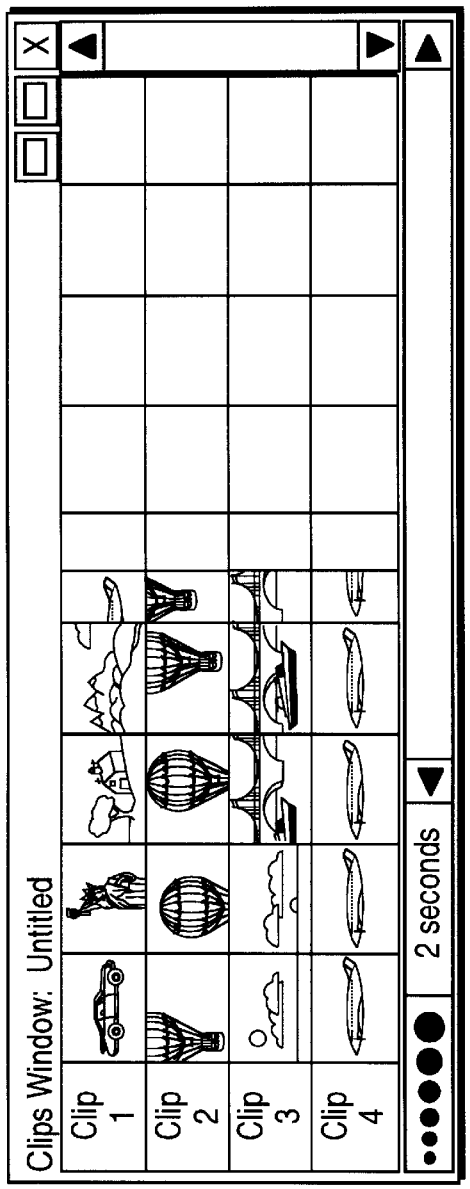

FIG. 5a illustrates the clip window by tape. The clips are displayed continuously one after the other. A solid red line shows the separation between clips, and a solid green line shows separation within clips. FIG. 5b illustrates clips displayed by index. Each clip is shown on a separate line and the first grid inside the window indicates the clip number that is being shown on that line. If the thumbnails that need to be display do not fit all on the line, a horizontal scroll bar is provided to enable the user to have access. Similarly, if all the clips that needed to be displayed do not fit inside the window, a vertical scroll bar is provided to enable the user to scroll among the clips.

Figure 5C:
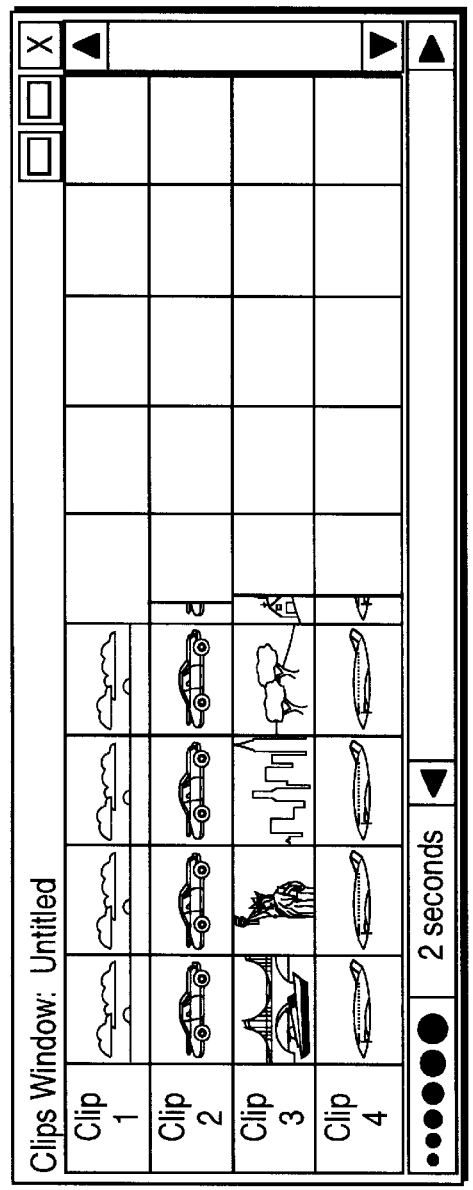

Alternately, the clips can be displayed by duration, from shortest to longest, and in ascending or descending order. Typically, the first clip will be the shortest and the last clip will be the longest. This is illustrated in FIG. 5c. When the clips are viewed by index or duration, there is an image at the beginning of every clip which indicates the clip number as illustrated in FIGS. 5b and 5c. For example, the first clip will be identified as clip 1, the second clip will be identified as clip 2 as shown. Referring back to FIG. 4, at step 420, the user utilizing the cursor control device, such as a mouse, moves the pointer to select, drag and drop clips from the clip window to the edit window to produce an edited video.

Figure 6A:
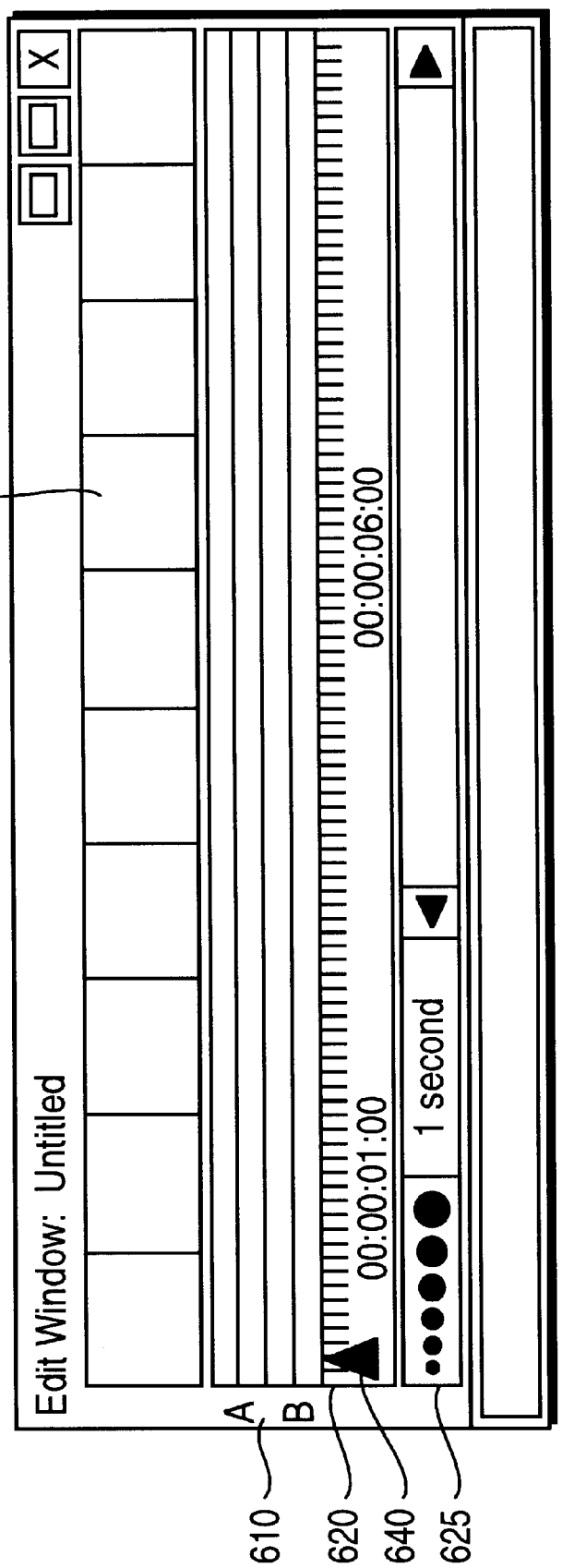
FIG. 6a illustrates the clip window.

FIG. 6a illustrates one embodiment of the edit window. Thus, the edit window displays the sequence of clips that are to be laid down on the recorded tape. In the present embodiment, the display can consist of a video and an audio subwindow. The video timeline, or subwindow 605, shows sequence of the clips to be recorded. Each clip is delineated by a colored marker between borders of clips. Underneath the video timeline, the audio tracks are displayed in the audio subwindow 610. Each audio track displays a frequency response view of the recorded audio. The topmost track is the audio associated with the clip (i.e., audio recorded with the video). Below the track is a dub track. The dub track is an overlay track which allows the user to mix in audio with the audio associated with the clips. Underneath the audio track is a scale showing the time range of the clip shown. The user can adjust the granularity of the display, and can scroll from the beginning to the end of the timeline. Below the audio tracks is a time code scale 620 and a zoom control 625 which functions like the zoom control of the clip window. The time code scale shows where along the line of the clips the insertion marker is located. To add a clip to the timeline, in the edit window, the user drags the clip from the clip window to the edit window. The drag element is similar to the clip in terms of the representation of what is being dragged. In the present embodiment a drag mode is entered by selecting or clicking the left mouse button anywhere inside a clip and holding the button down. Once in the drag mode, the drag element gets generated. The drag element is always displayed as a series of thumbnails in a single row. Once the left mouse button is released while in the drag mode the clip is dropped at the point where the left mouse button is released. If the clip is dropped within a window that knows how to accept a drag, e.g. the edit window or clipboard window, the clip gets added to the window. On the other hand, if the clip is dropped anywhere outside the edit window or clipboard window, the drag element disappears.

An arrow also referred to as the insertion marker is located underneath the timeline and indicates the current location of the beginning of the inserted clip relative to the timeline, step 425 (FIG. 4). Preferably, to simplify and make it easy for the user, the insertion marker shows a point of insertion between clips that is closest to the current location of the cursor, as controlled by the cursor control device.

Thus, the user can drop the clip anywhere on the visible timeline, the insertion point indicated by the insertion marker 630, which corresponds to the closest clip border to the location of the cursor.

Figure 6B:
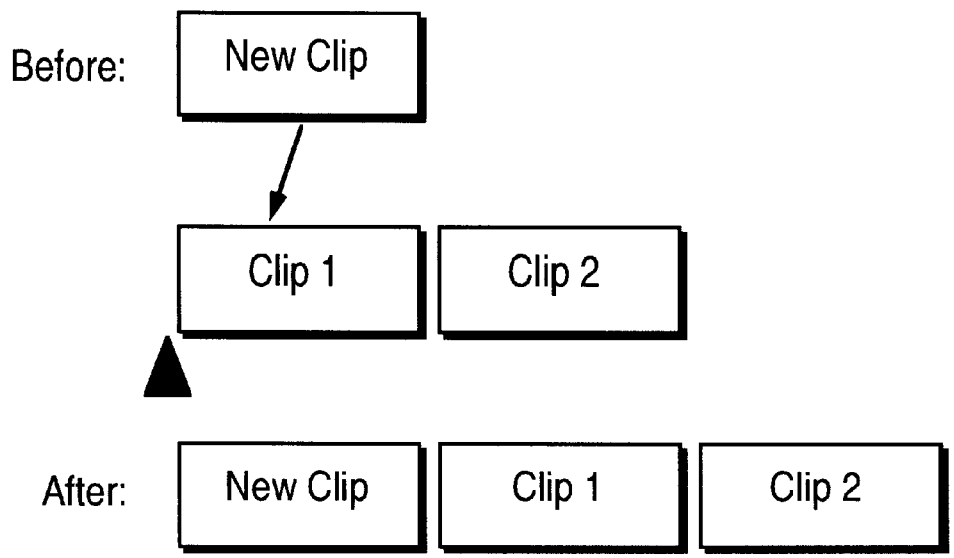
FIGS. 6b and 6c illustrate the function of adding clips in accordance with the teachings of the present invention.
Figure 6C:
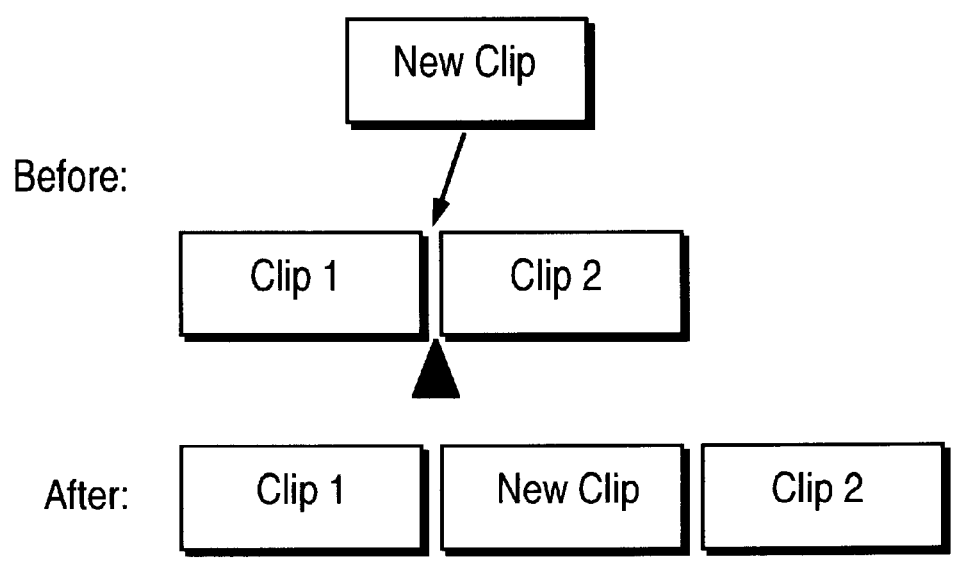

To make it easy for at-home use, clips are entered into the timeline in a manner such that no blanks occur between edits and no disruption occurring between edits of clips. For instance, as shown in FIG. 6*b*, when the user adds a clip to the end of the program, the clip is appended to the end. When adding the clip to the beginning, the old starting clip will be appended to the end of the inserted clip, and the inserted clip assumes the starting program time of the old starting clip. If a user places a clip between two clips, the clip will be inserted between the two clips such that the clip as well as the preceding clips attach at the tail of the inserted clip. If the user inserts the clip inside another clip (a clip whose duration is longer than the inserted clip), the placement of the inserted clip will be dependent upon the location of the insertion marker. That is, if the insertion marker is on the first half of the clip it will be attached to the head of the clip, otherwise the inserted clip will be appended. This is illustrated in FIG. 6*c*. It should be noted that the clip tool described can also be operative in the edit window as will the clip window.

Figure 7:
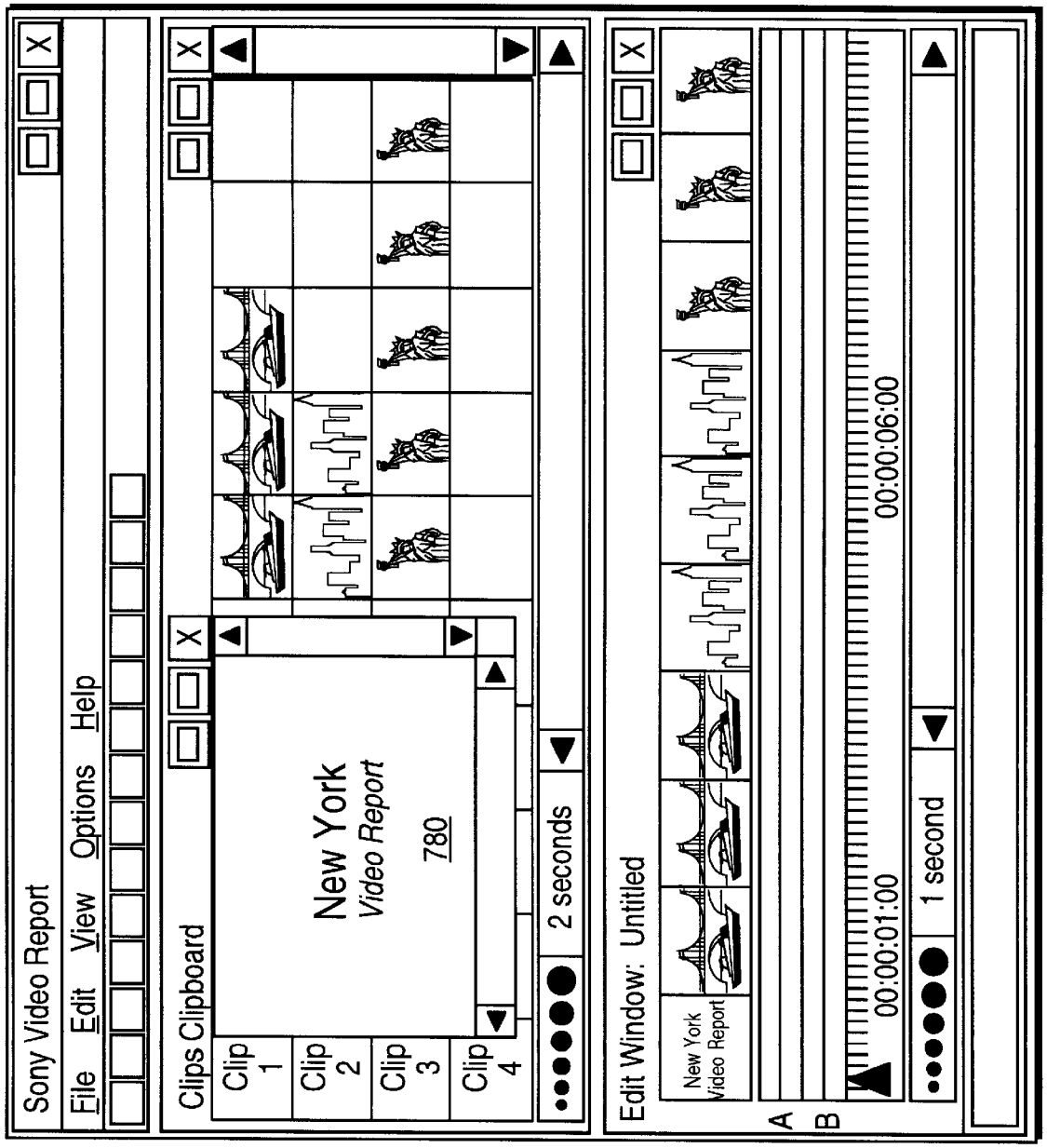
FIG. 7 illustrates an embodiment which includes the ability to paste images from a clipboard into the edit window.

Preferably the system enables the user to add clips to and from the clipboard. Preferably, this is done using a drag and drop mechanism similar to that described above with respect to the clip window. In the present embodiment, a single bit map image is automatically defined to be a clip with a predetermined set duration. Alternately, the application can allow the bit map to be a clip or an overlay over a video clip. An exemplary bit map clip is shown in FIG. 7. Thus, a user can create simpler titles, e.g., 700, for insertion between clips. As simple as clips can be added, clips can be deleted using a delete key, or selecting a "cut" menu option from the edit window. Any holes in the timeline in the edit window created by a deletion are automatically filled via a ripple effect.

As noted earlier, trimming the clip can be done via an erase mechanism. Preferably this is done in the edit window when the user moves the cursor up and down the timeline, a highlight will appear around the frame that has the eraser cursor (indicative of the erase mode) in it. To perform the actual trim function, the user clicks a button on the cursor control device or presses enter. This removes the frame and resets the edit timeline. It is contemplated that the system provides a separate trim window similar to the clip viewer (FIG. 9) in which the trimming actions are more contained. Using this embodiment, the user can play, drag or fast forward to the point to trim. At this point, the user can hit a confirm button that closes the window and performs the trimming action. The trimming operation is therefore similar to adding a clip so that any empty gaps are automatically filled. The rule for filling gaps is that if the head has been shortened, the trimmed clip, as well as any preceding clips, pull up to the preceding clips' trail. If the tail has been shortened, the preceding clip, as well as any other clips after it will pull up to the trimmed clip's tail.

Once the user has finished making the desired edits, a master tape can be created. This is achieved, step 430, FIG. 4, by issuing commands to a playback device and a recording device to read and record video as represented in the edit window. Preferably, this is achieved by controlling an IEEE 1394 bus, to which the playback and recording devices are connected. As each clip has associated with it an identification of the ATN codes and a tape identification, control of the input and output devices is achieved. In one embodiment the entire set of clips in the timeline of the edit window is recorded. Alternately, the recording can start from a certain point along the timeline. Progress of the recording is preferably provided for the user. One way of displaying the recording process is a viewer that shows the output of the video to the recording device. Alternately, the current thumbnail being recorded is highlighted in the edit window. During execution of a record function, the user preferably has the option to pause or resume or to stop recording.

As noted above, a timeline may consist of clips from different tapes during recording the application must be able to detect when a tape change is needed by a change in the tape ID. Preferably a message box informs a user to change the tape of the given source device. Once this is completed, the application continues recording until the process is complete.

Figure 8A:
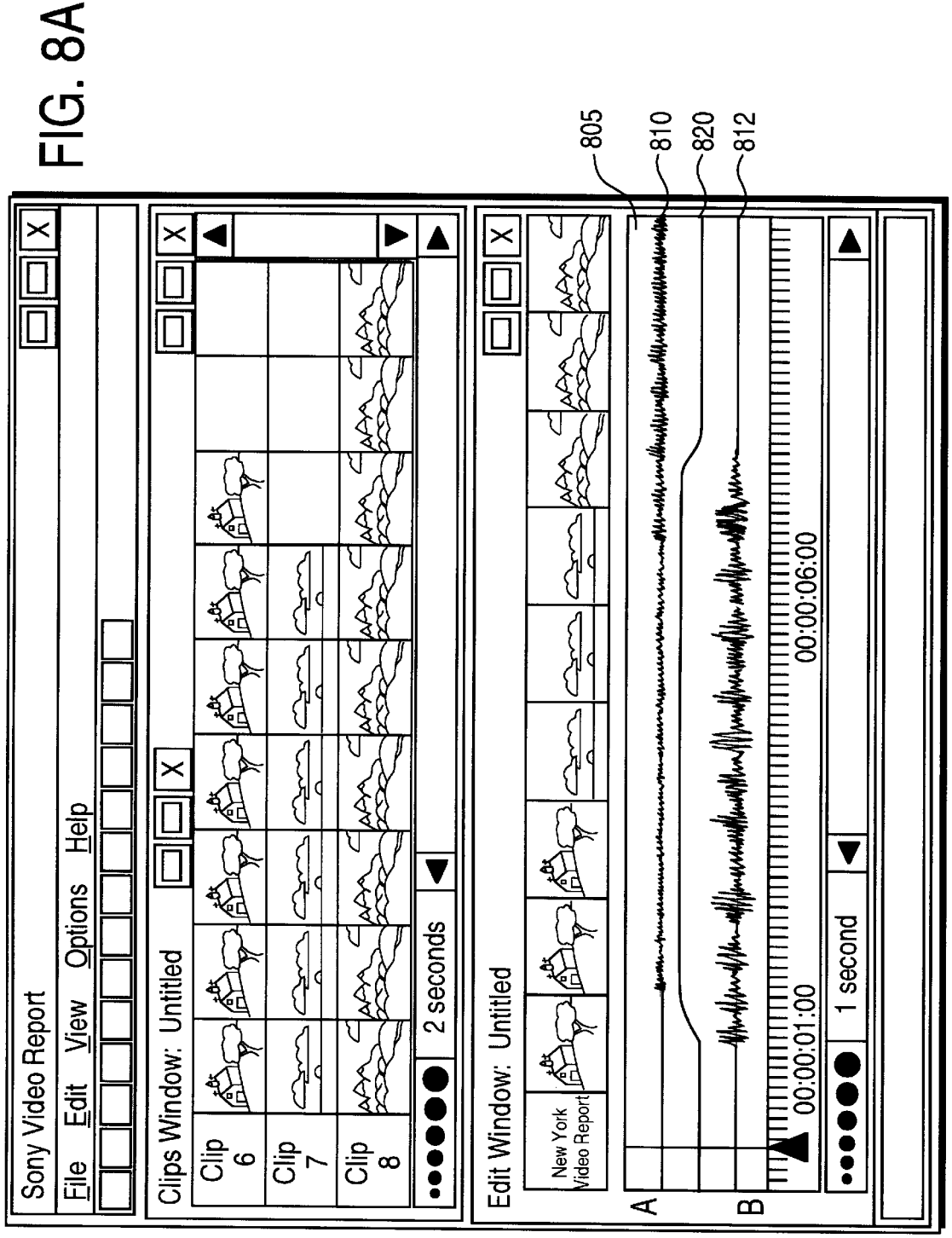
FIG. 8a illustrates the audio track subwindow.

As noted earlier, the graphical user interface includes a clip subwindow 805, as shown in FIG. 8*a*. The first audio track 810 underneath the video timeline is the recorded audio that is associated with the clip. As the editing function is simple for home use it is preferred that any editing action with respect to a video will be performed on the corresponding audio. Thus, any trimming or drag operations performed on the video correspondingly affects the audio. The second audio track 812, is a dub track which operates independently as an overlay. The dub track audio may be brought into the application by selecting a starting point on the audio track and then clicking a record microphone icon in the toolbar to begin recording audio from an external source (e.g. soundcard microphone). The user subsequently clicks on the record microphone icon again to stop the recording.

Once the clip and the dub track 812 are in place, the user can manipulate the clip like video. Ultimately, its contemplated that an audio control panel is provided that can either play a CD or sound file from the computer or control an external CD player to play the audio track. This audio control panel would operate similar to the clip viewer (FIG. 9) such that it can create audio clips in the clip window. Clips can also be imported via clipboard and can be added, deleted, and trimmed similar to the video clip methods described above. Preferably the audio tracks 810, 812 are displayed as a frequency response. Thus, expanding the zoom will result in a long series of sine waves. A compressed zoom, would appear more jagged. Preferably, audio tracks can be selected to be shown or not shown via the view option "show audio tracks".

To allow mixing the user must be able to adjust the audio level in each track. However, for simplicity the user is not able to separately adjust the left and right audio channels. In the present embodiment, the audio levels between the dub track and the clip audio tracks are adjusted graphically and relatively the audio level will be represented by a line down the middle of the audio track 820, in which initially represents a 50% level, that is the mix between the audio track and the dub track is 50%. The user is able to adjust the audio level line by grabbing the line using the cursor and moving the line up and down to adjust the level.

Alternately, the level could be controlled by setting the audio level for the entire track. Still another possible method is to let the levels be adjusted outside the application. For example, the user might adjust the level of a dub audio before inserted in the dub track.

FIG. 9, illustrates a clip viewer window. The clip viewer window is used in a number of places. For example it is used for manually scanning video tapes, viewing clips in the clip window, previewing clips and audio in the edit window, and is used to export a single full size image off of the video tape.

When a user chooses the option manual scan menu to scan the clips from a video tape, the clip viewer is used to view the tape, control the IEEE 1394 source (playback) device, and select the in and out points of each clip to be put into the clip window. The clip viewer window is displayed, if it is not already open, and the video display, running time display, clip input display, and clip output display are blank. Current time display will display blank if a tape is not loaded in the source device and will display a current location of the tape if the tape is loaded. The tape ID is read from the tape and the current ATN number is read to establish the current time display. The running time display remains blank until the clip and input display or clip output display contains a value. After a clip viewer has been brought up in a clip window the user may use it to capture clips. Both the clip in point display and the clip out point display are blank to start with. The user may enter in numbers directly into these fields, blank the fields with the delete key, or press the clip in button or clip out button. The clip in point display and clip out point display are preformatted fields. The user may select either the in value or out value first, once the value is selected the values are validated and calculated and the ATN numbers are passed to the clip window. At this point the clip window scans the requested thumbnails and corresponding audio. The view window then blanks the clip in point display, clip out point display and running time display. If the clip out point display is less than the clip in point display, the user indicates that the clip should be recorded backwards from the clip out point display to the clip in point display. If the clip in point display equals the clip out point display then the user is indicating that the clip should contain one thumbnail.

Another use of the clip viewer is to review the thumbnails that have been brought into the clip window. For example, by double clicking on the clip in a clip window, the clip window viewer is automatically displayed and the selected clip is played in the clip viewer display starting at the thumbnail that the user clicked on. The clip viewer continues playing back each clip in the clip window in the order as it appears until the user presses another button or double clicks on another clip. The clip in button and the clip out button are disabled while viewing clips in the edit window.

Preferably, the user interface also provides a tape library. The tape library is a collection of thumbnails captured during auto scan or manual scan of the users video tape. Once the tape is scanned the frames are stored in the clip window. These scanned thumbnails can be stored in the tape library so that the tape does not have to be scanned the next time the user wants to use clips from that tape. When the user selects the menu option library, the tape library window is displayed on the screen. An embodiment of this is shown in FIG. 10. The user may view the names of the tapes alphabetically or the date the tapes were made. Once, the tape library window is open, the user may select a tape by selecting (e.g., double clicking) a specific tape selection. Selecting loads the thumbnails into the clip window. It is contemplated that the user may be able to cut, copy, paste, and clear from the tape library. User can save clips in the clip window to the tape library with the library save menu option. If the user selects this menu option, the tape library window is displayed and the dialog box asks for a name to store the tape under. The tape names can be renamed, deleted, and the library viewed by date or name.

Images can be input into the clipboard and out of the clipboard for movement of clips. If an image is input to the clipboard via a drag and drop operation, then the clipboard contains the thumbnails of the clip that was represented by the clipboard drag element from the edit window. If the image into the clipboard is coming from a file copy operation then the clipboard contain the thumbnails from the clips that were selected in the edit window.

Preferably, the clipboard window displays all the thumbnails just as they would be displayed in clip window at a fix zoom of the window they came from. Scroll bars are then provided as needed to display the rest of the clip. If the system clipboard contains a clip, the operation works as if is has been copied from the clip window and pasted directly to a drag element. If the system clipboard contains a single object that is not a clip, a copy of the clipboard memory is stored in a 640 by 480 resolution to be inserted in the destination video tape. If the image in the clipboard is large than 640 by 480 the application automatically crops the image leaving the center of the image in a 640 by 480 size.

Alternately, the user can adjust, crop, or scale the image in the clipboard to fit the 640 by 480 size. If the image is smaller than 640 by 480 the clipboard window automatically positions the image in the center of the clipboard and fills the rest of the clipboard with a background color. Alternately, the user can reposition or scale the image to the 640 by 480 resolution. When the user drags a clip from the clipboard window to the edit window a series of 90 by 60 thumbnails come from the clipboard and are put into the drag element. If the clipboard contains a single object, the application puts a single thumbnail into the drag element. The drag element is a mirror image of a particular clip or part of a clip that can be drag from one window to another window.

What is claimed is:

1. A home movie editing system, comprising:
    a first input configured to receive at least one input video stream comprising at least one video clip;
    a video clip window on a display device, said video clip window configured to display thumbnails of the video clips input, each of said thumbnails comprising a frame of video of a corresponding clip;
    a video clip edit window on a display device, said video clip edit window configured to display a sequence of thumbnails of selected video clips;
    a cursor control device controlling a cursor on the display, said cursor control device configured to use the cursor to select video clips displayed in the video clip window, drag each selected video clip into the video clip edit window and drop the selected video clips at a determined location in the video clip edit window; and
        wherein said video clip edit window further includes an insert marker, said insert marker configured to point to the closest video clip boundary relative to the location of the cursor, said insert marker configured to identify a point of insertion of a video clip dragged to the video clip edit window.

2. The home movie editing system as set forth in claim 1, further comprising a view clip window, said view clip window enabling a user to view a video corresponding to a selected video clip.

3. The home movie editing system as set forth in claim 1, further comprising a library window, said library window identifying the video clips currently accessible.

4. The home movie editing system as set forth in claim 1, further comprising a video control bus coupled to the system, said video control bus enabling the system to send control information to control a video play device and a video control device and to communicate data between the video play device and video control device.

5. The home movie editing system as set forth in claim 1, further comprising an audio control window, said audio control window graphically representing a relative loudness of audio tracks, said relative loudness modifiable by changing the graphical representation.

6. The home movie editing system as set forth in claim 1, further comprising a controller configured to generate a plurality of thumbnails of video clips, said video clip window configured to display a subset of the plurality of thumbnails according to a selected resolution.

7. The home movie editing system as set forth in claim 1, further comprising a controller configured to generate output information of video clips corresponding to the sequence of thumbnails of selected video clips in the video clip edit window.

8. A method for editing an input video comprising at least one clip:
   receiving at least one input video stream comprising at least one video clip;
   generating at least one thumbnail of the at least one video clip;
   displaying the thumbnails in a video clip window;
   providing a pointer on the display, said pointer under control of a cursor control device;
   selecting at least one video clip in the video clip window using pointer;
   dragging selected video clips to a video clip edit window;
   displaying an insert marker in the video clip edit window, said insert marker pointing to a closest video clip boundary relative to the location of the pointer in the video clip edit window and identifying a point of insertion of each selected video clip dragged to the video clip edit window;
   dropping selected video clips at determined locations in the video clip edit window; and
   displaying in the video clip edit window thumbnails of selected video clips in the sequence reflected by the locations the selected video clips were dropped.

9. The method as set forth in claim 8, wherein the step of generating output information comprises:
   outputting control information to a coupled playback device to playback the selected video clips in the sequence shown in the video clip window; and
   outputting control information to a coupled recording device to record the selected clips played back by the coupled playback device.

10. The method as set forth in claim 8, further comprising:
    displaying an audio window graphically indicating the relative loudness of audio tracks corresponding to the clips; and
    using the pointer to modify the graphical indication of relative loudness to change the relative loudness of the audio tracks.

11. The method as set forth in claim 8, wherein displaying in the video clip window comprises the step of setting a thumbnail resolution indicative of the frequency of video clips selected and displaying a set defined by the resolution.

12. The method as set forth in claim 8, further comprising generating output information of video clips corresponding to the sequence thumbnails of selected video clips in the video clip window.

13. The method as set forth in claim 8, further comprising:
    selecting a clip and selecting a first predetermined control function; and
    providing a view clip window on the display to enable a user to view video of the selected video clip.

14. The computer readable medium as set forth in claim 13, further comprising executable instructions that when executed, cause the processing system to further perform generating output information corresponding to the sequence of selected video clips in the video clip window.

15. The computer readable medium as set forth in claim 13, further comprising executable instructions that when executed, cause the processing system to further perform:
    displaying an audio window graphically indicating the relative loudness of audio tracks corresponding to the clips; and
    enabling use of the pointer to modify the graphical indication of relative loudness to change the relative loudness of the audio tracks.

16. The computer readable medium as set forth in claim 13, further comprising executable instructions that when executed, cause the processing system to further perform:
    enabling selection of a video clip and selection of a first predetermined control function; and
    providing a view clip window on the display to enable a user to view video of the selected video clip.

17. The computer readable medium as set forth in claim 13, further comprising executable instructions that when executed, cause the processing system to further perform:
    displaying a library window comprising a listing of available video clips;
    enabling use of the pointer to select available video clips; and
    displaying selected available video clips in the video clip window.

18. The method as set forth in claim 8, further comprising:
    displaying a library window comprising a listing of available video clips;
    using the pointer to select available video clips; and
    displaying selected available video clips in the video clip window.

19. A computer readable medium containing executable instructions which, when executed in a processing system, causes the system to perform editing functions, comprising:
    receiving at least one input video stream comprising at least one video clip;
    generating at least one thumbnail of the at least one video clip;
    displaying the thumbnails in a video clip window;
    providing a pointer on the display, said pointer under control of a cursor control device;
    enabling selection of at least one video clip in the video clip window using the pointer;
    enabling a drag of the selected clips to a video clip edit window;
    displaying an insert marker in the video clip edit window, said insert marker pointing to a closest video clip boundary relative to the location of the pointer in the video clip edit window and identifying a point of insertion of each selected video clip dragged to the video clip edit window;
    enabling the drop of the selected video clips at determined locations in the video clip edit window;
    displaying in the video clip edit window thumbnails of selected clips in the sequence reflected by the locations the selected video clips were dropped.

* * * * *